UNITED STATES PATENT OFFICE.

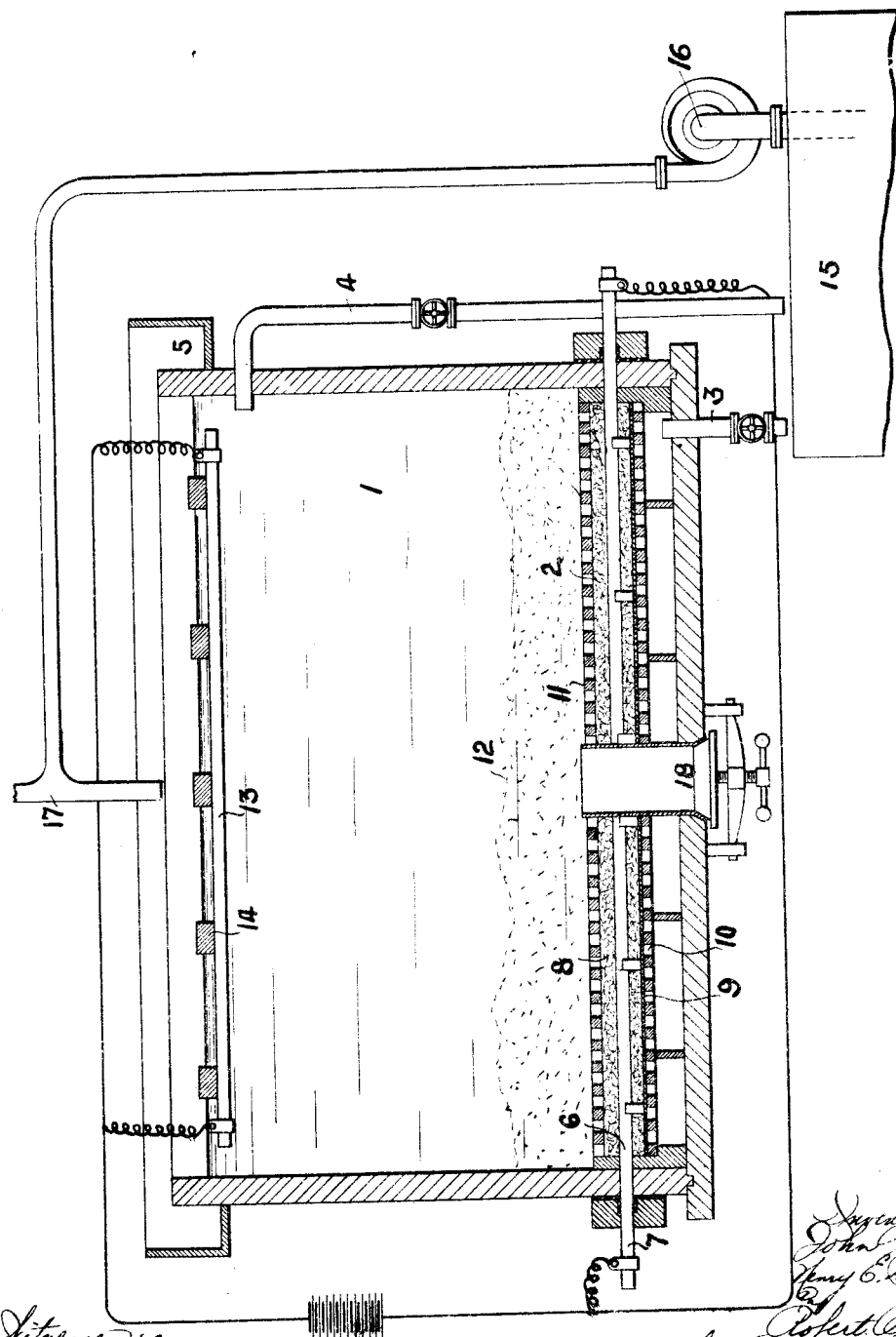

JOHN FOYE, HENRY EGBERT MOORE, AND ROBERT BOYLE, OF JOHANNESBURG, TRANSVAAL, SOUTH AFRICA, ASSIGNORS TO REFRACTORY ORES, LIMITED, OF JOHANNESBURG, TRANSVAAL, SOUTH AFRICA.

TREATMENT OF REFRACTORY ORES.

1,113,323.   Specification of Letters Patent.   Patented Oct. 13, 1914.

Application filed March 31, 1913. Serial No. 758,016.

*To all whom it may concern:*

Be it known that we, JOHN FOYE, HENRY EGBERT MOORE, and ROBERT BOYLE, all British subjects, residing at (1) 108 Anderson street, Johannesburg, in the Province of the Transvaal, Union of South Africa, and (2 and 3) Village Main Reef Gold Mining Company, Limited, Johannesburg aforesaid, have invented certain new and useful Improvements in the Treatment of Refractory Ores, of which the following is a specification.

The present invention relates to the treatment of refractory auriferous and other precious metal ores; the purpose being so to treat such ores as to render them readily amenable to the ordinary extraction methods, such as the cyanid process.

In the treatment according to the present invention, the ore is subjected to the action of an electric current in a solution of a soluble salt of sodium, potassium or ammonium, or a mixture of any such salts, which are substantially non-solvents of gold, e. g. the chlorids, sulfates or nitrates. The anode is positioned in contact with or in proximity to the ore, while the cathode is placed in the solution, but out of contact with the ore. Current passed between the electrodes, produces an acid solution in the neighborhood of the anode and an alkaline solution in the neighborhood of the cathode. The ore is then separated from the liquid, whereupon, if the period of treatment has been sufficient, the ore is left in a condition for further treatment by any usual extraction process.

It is desirable to regenerate the solution, for which purpose the acid and alkaline solutions are withdrawn separately from the ore treatment vessel and then brought together in another vessel. A precipitate is thereby thrown down which appears to consist of the refractory constituents of the ore, often much changed in character. Said precipitate may be treated for the extraction of any valuable metals it may contain. To effect the precipitation it is necessary for the solution to be neutral or alkaline, and if this condition is not reached upon the admixture of the acid and alkaline liquids, further alkali, such as sodium hydrate, is added. The liquid so produced, consisting of the regenerated original solution, together with sulfate or other salt due to the oxidation of pyrite by the oxygen liberated at the anode or to the added alkali (if any), may then be employed for further treatment.

The process may be made continuous, the separate acid and alkaline solutions being continuously withdrawn and fresh solution,—e. g. that regenerated in the precipitation vessel,—being continuously supplied. Certain light constituents of ores, e. g. graphitic matter, are liberated from the ore during the treatment and float to the surface of the liquid. These may be removed by skimming or withdrawing the surface layer of the liquid.

The strength of the solution may vary very considerably according to the nature of the ore under treatment, and the salts employed. By way of example, it may be mentioned that solutions of from 2% to 15% strength have been used with success and that the average strength is about 3%.

Owing to the complicated nature of refractory ore it is impossible to give any definite statement of the chemical reactions which take place under this process. When the electric current passes through the solution in the vat the solution is electrolized, its alkaline component forming in the vicinity of the cathode and the acid component in the vicinity of the anode. It is the acid component, probably in the nascent state, which attacks the refractory constituent of the ore and for this reason it is necessary for the anode to be in contact with the ore. It appears that either the gold in the ore is unattacked or that it does not go into solution owing probably to the presence of the refractory constituents of the ore which do go into solution. Thus iron in the form of pyrites generally forms a part at least of the refractory constituent and the ferrous sulfate formed therefrom would prevent the gold from going into solution.

A form of apparatus for carrying out the process is shown diagrammatically in the accompanying drawing.

1 is a vat provided with a filter floor 2, below which is a draw-off cock 3 for the acid solution. A draw-off cock 4 for the alkali solution is positioned in the upper part of the vat. An overflow launder 5 may be placed around the rim of the vat and used for withdrawing the surface layer of the liquid when necessary.

The anode 6 may consist of a number of carbon rods 7 passing through the lower part of the vat and surrounded by a layer of coke 8. As illustrated in the drawing, the coke lies on a filter mat 9 supported by a grating 10. A further grating 11 covers the top of the coke and serves to keep the same in place and prevents the layer of ore 12 mixing therewith. The cathode is conveniently formed to float at the surface of the liquid and may consist of carbon or metal rods 13 or plates secured to a wooden framework 14. This construction assures the cathode being in proper contact with the solution, although the height of the latter in the vat may vary from time to time during the treatment of the ore.

15 is the vessel in which the acid and alkali solutions are re-combined as above described, and 16 is a pump for returning the regenerated solution to the vat.

17 is the inlet for fresh solution and 1o the discharge gate for the treated ore.

There must be no electrical connection between acid outlet 3 and alkali outlet 4.

The apparatus as illustrated may be modified in various ways. Thus, the vat may be provided with a separate chamber, with which its lower part is in communication. The acid draw-off cock may be positioned in the wall of such chamber and thereby brought to the same height as the alkali draw-off cock, the uniform withdrawal of the two liquids being thus facilitated. In this case, the filter mat may be positioned vertically to cover the opening between the vat proper and the chamber, so enabling a smaller mat to be used, while protecting it from wear and facilitating its renewal.

As an example of the process it may be assumed that the material treated is a refractory ore having its gold in association with iron pyrites. According to this invention such an ore is placed in vat 1 charged with a suitable solution for instance of sodium chlorid. Passage of the current between anode 6 and cathode 13 will split up the solution and chlorin with other ions in a nascent state will be liberated at the anode. It has been found that the iron is attacked by the nascent chlorin and forms soluble compounds therewith.

By dissolving the iron out of the ore the latter is left amenable to treatment for the extraction of the gold by any suitable process, e. g. it may be cyanided in the usual way.

The sodium chlorid solution is regenerated by mixing the solution containing the iron and chlorin with the sodium solution which may be withdrawn from the vicinity of the cathode. The sodium will replace the iron and sodium chlorid is reformed.

What we claim and desire to secure by Letters Patent is:—

1. The process of treating refractory ore for the purpose of rendering it amenable to ordinary extraction methods, which consists in subjecting the ore in admixture with a solution of the salt of an alkaline metal, which is substantially a non-solvent of gold, to the passage of an electric current, whereby the acid component of the solution separates in proximity to the ore and the alkaline component away therefrom, and subsequently separating the ore and solution.

2. In apparatus for treating refractory ore for the purpose of rendering it amenable to ordinary extraction methods, the combination of a vat, a filter floor therein, a float adapted to float at the surface of solution in the vat, electric conductors thereon and adapted to project into the solution; an anode in the lower part of the vat, and means for separately drawing off solution from the vacinities of the anode and cathode respectively.

In testimony whereof we affix our signatures in presence of two witnesses.
JOHN FOYE.
HENRY EGBERT MOORE.
ROBERT BOYLE.
Witnesses:
WESLEY E. JOHN,
J. WARREN DENNING.